Dec. 25, 1928.
E. L. BARNES
COMPRESSOR
Filed May 22, 1925
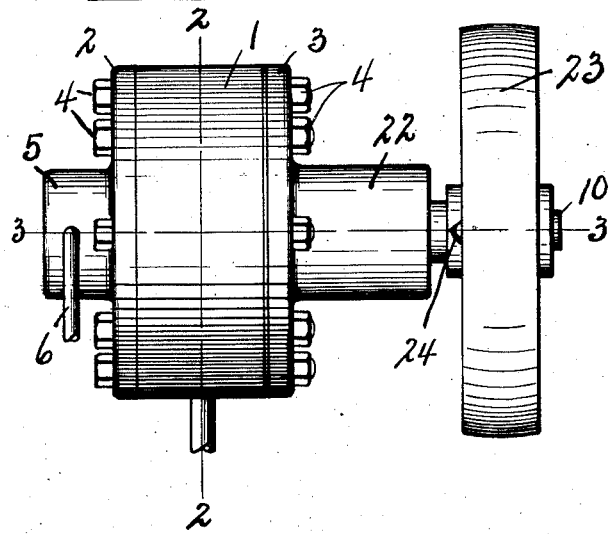
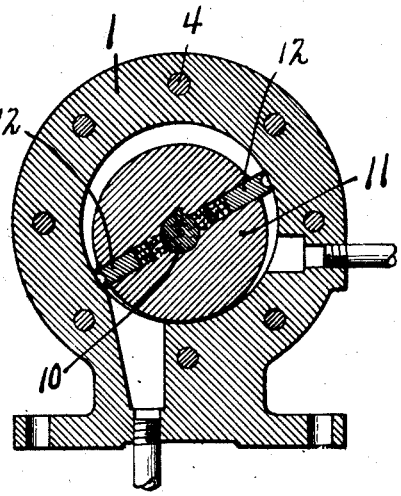
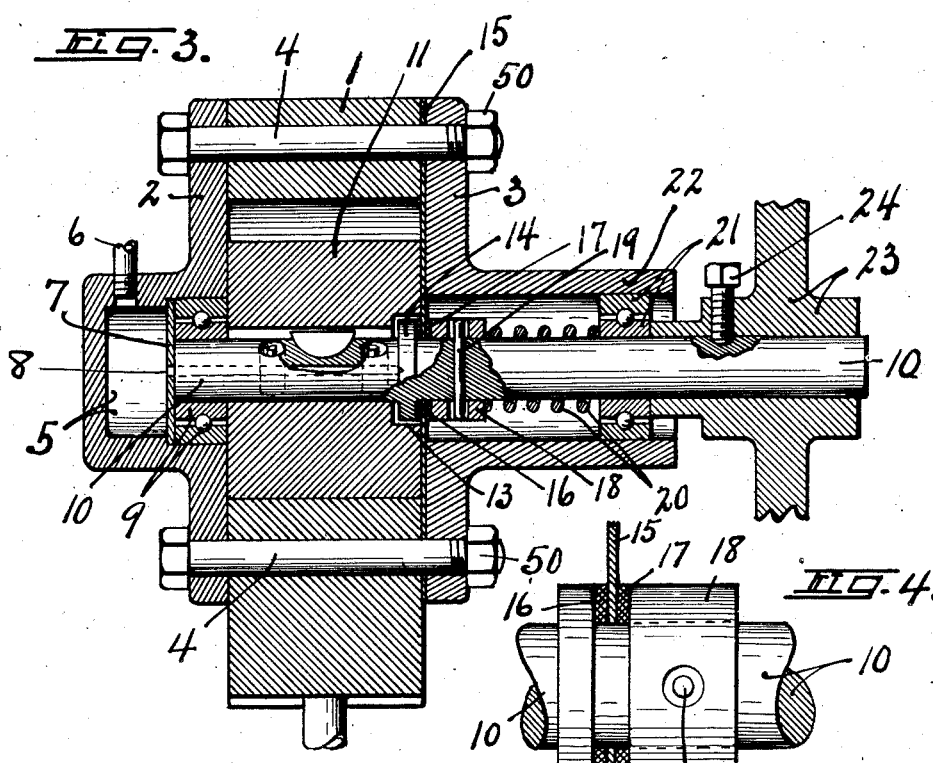
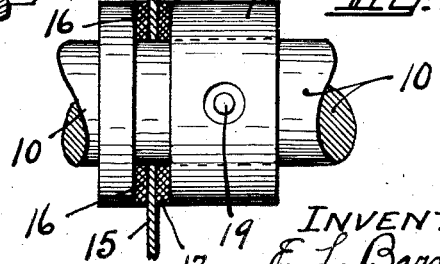
INVENTOR
E. L. Barnes
Denison Thompson
ATTORNEYS Patented Dec. 25, 1928.

1,696,564

UNITED STATES PATENT OFFICE.

EUGENE L. BARNES, OF WATERTOWN, NEW YORK, ASSIGNOR TO THE BARBER ASPHALT COMPANY, OF PHILADELPHIA, PENNSYLVANIA, A CORPORATION OF WEST VIRGINIA.

COMPRESSOR.

Application filed May 22, 1925. Serial No. 32,174.

This invention relates to certain improvements in compressors, and more particularly to a rotary compressor in which the structure includes means for sealing the compressor against the escape of a fluid medium along the driving shaft of the compressor.

The compressor is particularly designed for use in connection with refrigerating apparatus in which a refrigerating medium—gaseous at certain pressures and temperatures—is utilized, and the main object of this invention is to provide a structure for preventing the escape of gas or fluid along the compressor shaft, and particularly at the point where the shaft penetrates the compression chamber.

Other objects and advantages relate to the details of the structure for accomplishing the primary object of this invention, all as will more fully appear from the following description taken in connection with the accompanying drawing, in which:

Figure 1 is a top plan view of a compressor embodying the present improvements.

Figure 2 is a section on line 2—2, Figure 1.

Figure 3 is a section on line 3—3, Figure 1; and,

Figure 4 is an enlarged view of a portion of the means provided for sealing the structure against the escape of gas or liquid along the shaft.

As illustrated, the compressor includes a casing comprising the usual cylinder —1— and end heads —2, 3—. These portions of the structure are rigidly secured together in any suitable manner as by bolts —4— equipped with nuts —50—. In the structure here illustrated, the head —2— is formed with an eccentrically arranged outwardly extending hollow boss —5— into which lubricant is adapted to be admitted through pipe —6— from any suitable source.

The interior of the boss —5— is preferably enlarged and shouldered near its inner end for the reception of a thin disk —7— of suitable material, such as sheet metal having a small perforation —8— preferably arranged near its central portion. A ball bearing —9— for the inner end of the compressor shaft —10— is likewise mounted, as here illustrated, in the enlarged portion within the boss —5— and may be in substantial contact with the disk —7—, and has its inner surface flush with the inner wall of the head —2—. The shaft —10— is splined or keyed to the usual rotor —11— carrying in this instance two blades —12— spring-pressed outwardly, and preferably the shaft —10— is formed with an axial passageway illustrated in dotted lines, Figure 3, and in full lines Figure 2, adapted to receive lubricant from the hollow boss —5— through the perforation —8— and convey it through radial passageways in the shaft —10— to the rotor blades —12— and thereby to the interior of the cylinder —1—.

The rotor —11— at its outer end is formed with an enlarged bore —13— and the shaft —10— is formed with a collar or circumferential flange —14— fitted in said enlarged bore of the rotor. A thin disk —15— of suitable material, such as resilient metal, preferably bronze, etc. is secured in position between the cylinder —1— and the front head —3—, and has an opening of a size adapted to and arranged to receive the shaft —10—. Between the inner face of the annular disk —15— and the flange —14— upon shaft —10— is interposed a disk —16— of anti-frictional and non-scoring material, preferably fiber, and a similar disk —17— is mounted upon shaft —10— and held in contact with the outer surface of the inner edge of the annular disk —15—.

Outside of the disk —17— there is mounted upon the shaft —10— a collar —18— capable of limited movement lengthwise of said shaft, which is held in place by means of a pin —19— fixed in and extending through the shaft 10 and having its opposite ends projecting radially to seat in openings in the collar —18—. These openings are larger than the ends of the pin —19—, whereby limited movement of the collar 18 is permitted. The collar —18— is backed up by means of a coil spring —20— surrounding the shaft —10— and having its rear end in contact with the collar —18— and its front end in contact with the inner section of a ball-bearing —21— for the shaft —10—, said ball bearing having its outer section mounted in the cylindrical hub —22— formed on the head —3—. The driving pulley —23— is secured to the shaft 10 in any suitable manner, as by a set screw —24— and it will be obvious that the spring —20— may be properly tensioned between the collar —18— and the ball-bearing —21— by pressing the ball-bearing inwardly or permitting it to move outwardly in accordance with the position of the hub of the pulley —23— and then rigidly securing said pulley in the desired position by means of the set screw —24—.

It will be obvious that the fiber disk —16— is tightly confined and compressed between the flange —14— and the inner face of the disk —15— and that the fiber disk —17— is similarly compressed between the outer surface of the inner portion of the disk —15— and the inner end of the collar —18—, and that under any condition of operation, the spring —20— being properly tensioned by positioning the pulley —23—, a tight joint is positively maintained by axial compression which will prevent the escape of liquid or gaseous medium from the cylinder 1 of the compressor along the driving shaft 10 of the rotor 11. Or, in other words, the tight joint about the shaft —10— is maintained by constant axial compression of the disks —16— and —17— directed against said shaft.

The inner central face of the disk —15— is in practical effect a flange rigidly secured to and extending inwardly from the head —3— and is as above described, preferably of a somewhat flexible resilient nature so as to compensate for and freely permit satisfactory rotation of the compressor shaft, should the same be slightly loose in its bearings, or out of line, while at all times maintaining a sealed joint.

It is possible to omit anti-frictional disk —16— if the shaft flange and the inner central face of disk —15— are formed of suitable metals with perhaps somewhat less advantageous results, and the disk —17— may at times be entirely omitted and a ring of any material substituted for it. The pin 19 may be entirely omitted with the collar 18 freely slidable along the shaft 10, and this is particularly true when an arrangement is used in which said collar and the spring 20 do not rotate with the pulley 23.

Altho I have shown and described a specific structure as illustrative of a perhaps preferred embodiment of my invention, I do not desire to restrict myself to the details of the same, or to the particular form and relation of the parts thereof, as various changes and modifications may be made within the scope of the appended claims.

I claim:—

1. In a rotary compressor, the combination with the compressor casing of an apertured flexible diaphragm secured to the casing at its outer portion; a rotary shaft in the casing extending through said diaphragm; and means turning with said shaft in rubbing contact at each side of said diaphragm, including an abutment shoulder on the shaft at one side of the diaphragm, a collar on the shaft turning therewith at the other side of the diaphragm, and means yieldingly urging said collar toward said diaphragm and shoulder.

2. In a rotary compressor, the combination with a compressor casing having a lateral bearing housing and a shouldered rotary shaft in said casing with a bearing in said housing, of a flexible diaphragm around the shaft between shoulder and bearing, a collar on the shaft between diaphragm and bearing, and spring means between said bearing and collar urging the latter toward said diaphragm and shoulder.

In witness whereof I have hereunto set my hand this 12th day of May, 1925.

EUGENE L. BARNES.